July 6, 1943.   L. S. LINDEROTH, JR   2,323,405
DUST SEPARATOR
Original Filed May 5, 1939   2 Sheets-Sheet 1

INVENTOR
Lambert S. Linderoth Jr.
By his attorney

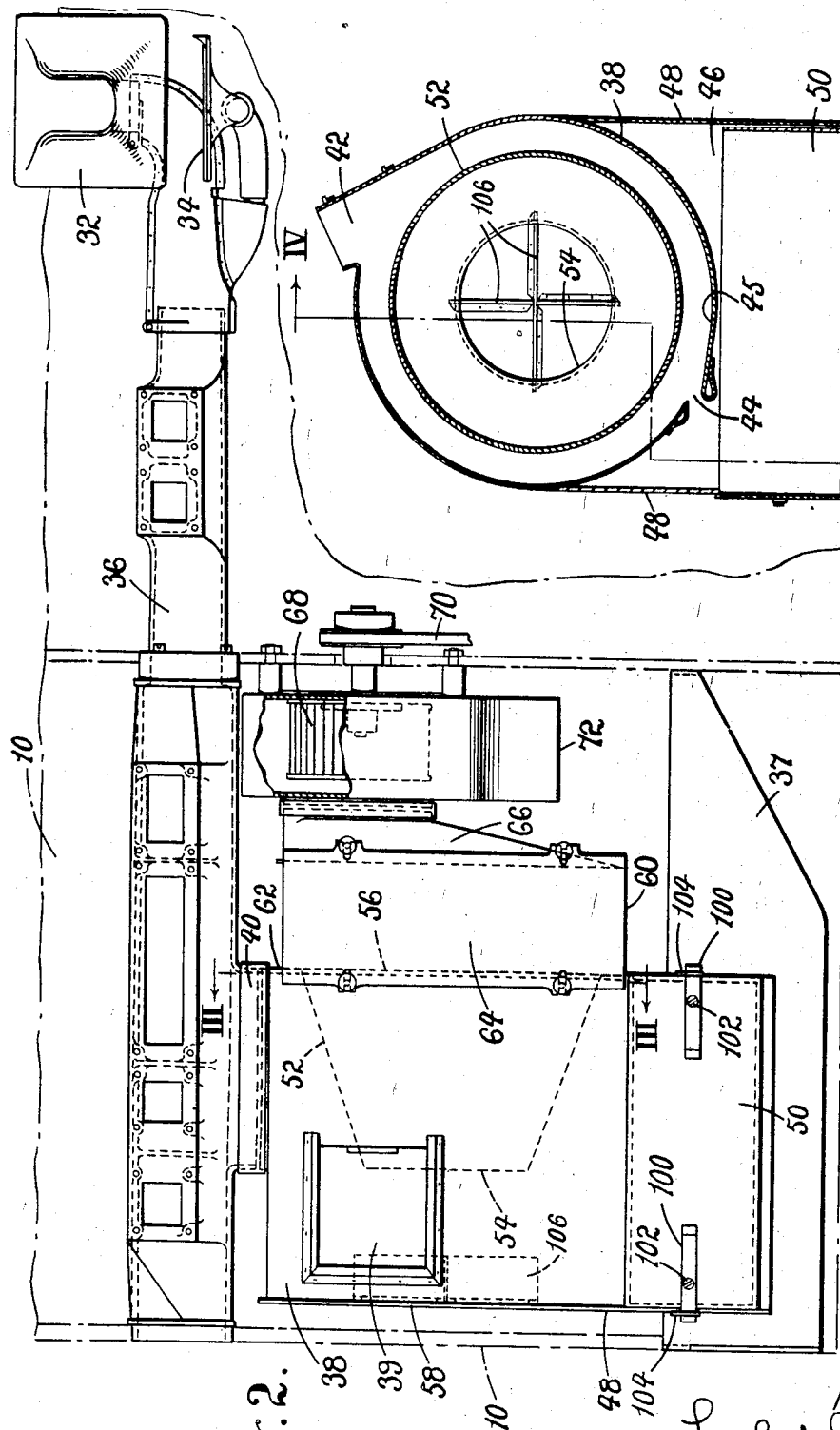

Patented July 6, 1943

2,323,405

UNITED STATES PATENT OFFICE 2,323,405

DUST SEPARATOR

Lambert S. Linderoth, Jr., Marblehead, Mass., assignor to United Shoe Machinery Corporation, Flemington, N. J., a corporation of New Jersey Original application May 5, 1939, Serial No. 271,965. Divided and this application May 8, 1941, Serial No. 392,430

1 Claim. (Cl. 183—80)

This invention relates to dust separators and is herein illustrated and described as embodied in a dust separator similar to that disclosed in a United States Letters Patent No. 2,282,365, granted May 12, 1942, upon an application of which the present application is a division. The dust separator disclosed herein is in all respects similar to that disclosed in the patent above-mentioned except that it includes additional structure. The illustrated dust separator, like the subject matter of the said patent, is suitable for use in a shoe repair machine of the type disclosed in United States Letters Patent No. 2,260,480, granted October 28, 1941, upon an application filed in the name of Frederick A. Prahl, Jr. Shoe repair machines of this type are provided with various tools which in their operation give rise to considerable quantities of dust and chips which must be continuously removed from the locality of operation. Since it is impracticable to discharge this material into the atmosphere, some means are usually provided for separating it from the air in which it is entrained.

It is an object of the present invention to provide a dust separator sufficiently compact to be received within the housing of a shoe repair machine of the type above referred to and which, nevertheless, is capable of separating effectively the entrained dust without increasing the power requirements to an extent commercially prohibitive. The dust separator illustrated herein is constructed in the form of a round casing into which dust-laden air from the various dust hoods is introduced tangentially and forced to circulate about a frusto-conical baffle and thence into the small end of the baffle and through the baffle to a filter for removing the finer particles of dust. As illustrated herein, the casing may conveniently be cylindrical. The frusto-conical baffle helps to define a circular path for the incoming air, thereby insuring that the heavier particles will be whirled out by centrifugal force and will pass through a slot formed in the casing. These heavier particles, if allowed to remain in the air current, would clog the filter provided for removing the finer particles of dust. The baffle serves also as an outlet conduit for the air from the casing of increasing cross-sectional area which reduces the velocity of the current of air before the air reaches the filter. Such slowing down prevents the entrained dust particles from embedding themselves into the filter, as they might do if projected at high velocity. The shape of the baffle, moreover, admits of the air being introduced over a considerable area of the filter and not concentrated in one locality. In the illustrated construction, there is provided another baffle to reduce the swirling movement of the air current before entering the outlet conduit. This materially increases the effective cross-sectional area of the conduit by rendering the central portion as well as the portion close to the wall available for the passage of air, which would not be the case if the air current were in rapid rotation. This baffle has been found to lessen the amount of power required to draw air through the apparatus.

These and other features of the invention will be described as embodied in an illustrative apparatus and pointed out in the appended claims.

Referring now to the accompanying drawings,

Fig. 2 is a front elevation of the collecting system with the dust hoods removed;

Fig. 3 is a vertical sectional view taken on the line III—III of Fig. 2; and

Figures 1, 4:
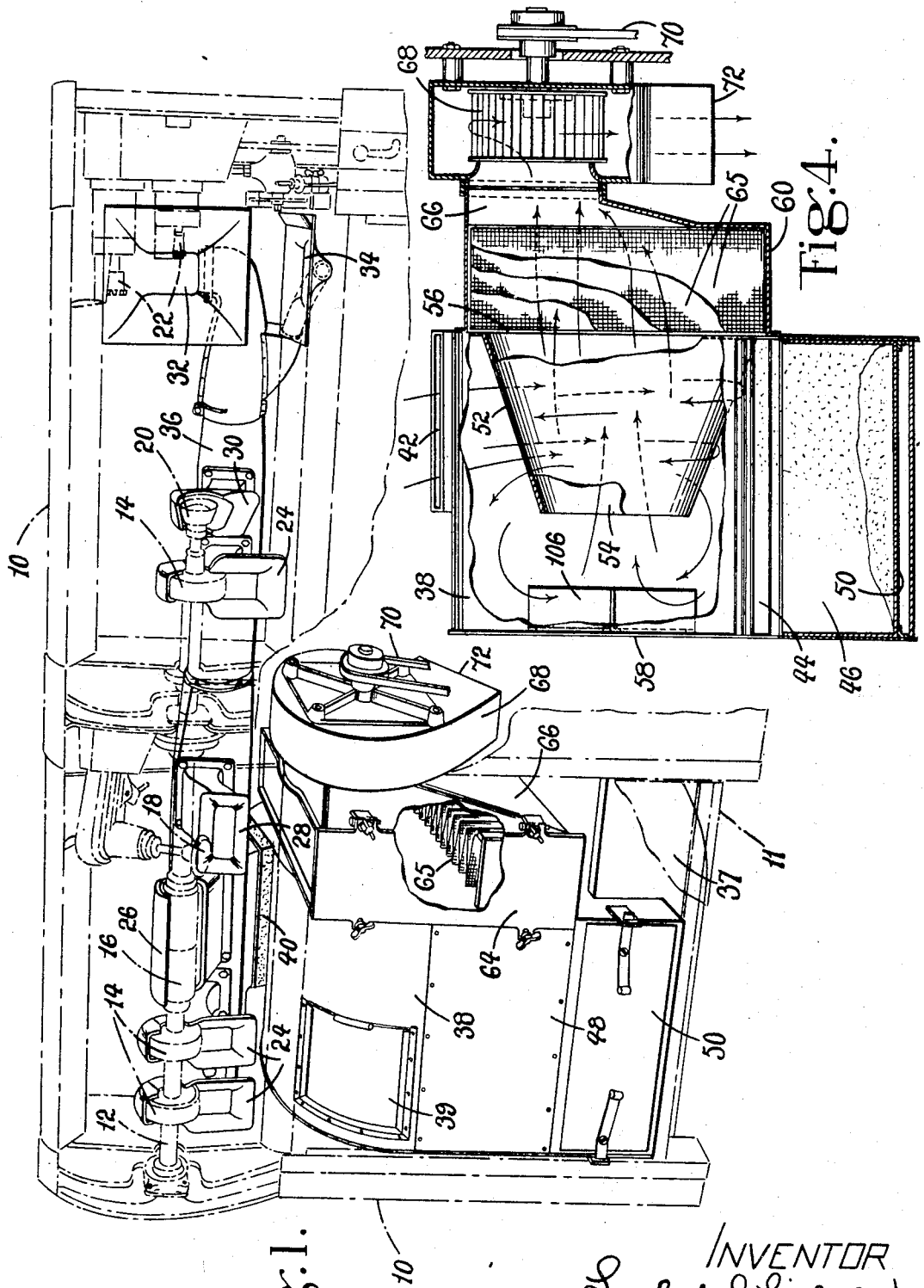
Fig. 1 is a perspective view of the improved dust collecting system.
Fig. 4 is a vertical sectional view taken on the line IV—IV of Fig. 3.

The improved dust separator is shown in the drawings in association with a portion of the shoe repair machine disclosed in the above-mentioned Patent No. 2,260,480. The frame and housing of the machine are shown herein in broken lines and together they constitute a cabinet-like structure indicated by the reference numeral 10. The lower portion of the cabinet-like structure 10 is normally closed by a plurality of removable front panels 11, one of which is fragmentarily shown in Fig. 1. Journaled in bearings carried by the frame 10 is a shaft 12 upon which are mounted three heel scouring wheels 14, a bottom scouring roll 16, a shank buffing tool 18, and a heel breast scouring tool 20. The machine is also provided with a pair of edge trimming tools 22. Associated with each of the heel scouring wheels 14 is a dust hood 24. The bottom scouring roll 16, the shank buffing tool 18 and the heel breast scouring tool 20 are provided with dust hoods 26, 28 and 30, respectively. These dust hoods are more particularly described and are also claimed in Patent No. 2,282,365 above referred to. A large draft opening 32 is provided in a rear wall of the machine casing in back of the edge trimming tools 22 to collect the dust resulting from the operation of these tools, while a draft opening 34 is provided in a shelf beneath the edge trimming tools to collect chips. All of the above-mentioned dust hoods and draft openings lead into a suction manifold 36 which extends lengthwise of the machine or parallel to the axis of the shaft 12. This manifold is designed to have a cross-sectional area at any point along its length corresponding to the volume of air flowing past that point.

Below the manifold 36 and directly connected thereto is an apparatus for separating the heavier particles of dust from the current of air in which they are entrained. This apparatus is housed within a compartment of the cabinet-like casing 10 and is supported by a bracket 37 carried thereby. It comprises a substantially cylindrical casing 38 having its axis substantially parallel to that of the shaft 12. Access to the interior of the casing may be had through a sliding panel 39. A connection 40 leads downwardly and also rearwardly from the manifold 36 into an inlet opening 42 (Figs. 3 and 4) of the casing 38. The inlet opening 42 is located at the upper portion of the casing rearwardly of the center line thereof to receive a current of air which is directed tangentially into the casing. It extends somewhat over half the length of the casing from a point beginning at the right hand end thereof. In the lower portion of the casing and extending substantially the full length thereof is a slot 44 (Figs. 3 and 4) through which heavy particles of dust may pass. This slot is positioned forwardly of the vertical center line of the casing and and is substantially diametrically opposite the inlet 42. The cylindrical wall of the casing is flattened at the locality indicated by the reference numeral 45 to enable the dust to pass tangentially through the slot 44. Beneath the casing 38 is a closed receptacle 46 into which the dust slot 44 opens. The receptacle 46 has front, rear, and end walls 48 which are secured in air-tight relation to the exterior of the casing 38. The lower portion of the receptacle 46 contains an air-tight drawer 50 which may be removed and emptied to dispose of the dust which accumulates therein, said drawer being easily accessible from the front of the machine upon removal of the panel 11. The drawer 50 is secured in closed position by latches 100 pivoted upon pins 102 on the drawer and engageable with stationary hooks 104.

Within the casing 38 and coaxial therewith is an open-ended frusto-conical baffle 52 which serves also as an exit conduit, having a small receiving end 54 within the casing and having a large discharge end 56 at the right hand end of the casing, as seen in Fig. 3. The baffle 52 like the inlet opening 42 extends somewhat over half the length of the casing; the length of the baffle in general should be from one half to two thirds the length of the casing and the length of the inlet opening 42 should be substantially equal to that of the baffle. The left-hand end of the casing is closed by a wall 58 (Figs. 2 and 4) and the large end of the baffle 52 opens into a filter chamber 60 secured against the right-hand end of the casing 38. The right-hand end of the casing 38 surrounding the large end of the baffle 52 is sealed by an end wall 62. In the illustrated machine the walls 58 and 62 are continuous with the left and right end walls 48 respectively of the receptacle 46. The filter chamber is provided with a removable panel 64 and contains a filter 65 of the type disclosed in United States Letters Patent No. 2,050,508, granted August 11, 1936, upon the application of Richard Strindberg. Fig. 1, for the purpose of clearer illustration, shows the upper portion of the filter 65 as cut away. This filter may be removed from time to time through the opening normally closed by the panel 64 for purposes of cleaning. A passageway 66 leads from the right-hand side of the filter chamber 60 to the intake of a fan 68 driven from any suitable source of power through a belt 70. The fan 68 creates the necessary suction for drawing air through the entire dust collecting system and exhausts the clean air through an opening 72 into the atmosphere. The casing, the filter and the fan are spaced close to each other, not only for compactness, but to reduce to a minimum the length of the path travelled by the air in its passage through the system.

The apparatus as so far described is identical with that disclosed in the above-mentioned Patent No. 2,282,365.

The efficiency of this apparatus is considerably improved by the addition of a baffle 106 secured to the left-hand end wall 58 and comprising four radially extending blades, each disposed at right angles to the blade adjacent. This baffle is coaxial with the casing 38 and the outlet 52. The blades are slightly longer than the radius of the receiving end 54 of the outlet, and they are wide enough to extend from the left-hand wall 58 about one-third of the distance to the open end 54 of the outlet.

In the operation of the dust separator the fan 68 creates a suction at the openings of the various dust hoods to draw into the manifolds 36 air laden with dust arising from the operation of the tools. This air is then delivered tangentially through the opening 42 into the casing 38 and whirls about the axis of the casing in an annular passageway defined by the baffle 52 and the wall of the casing. Gravity and centrifugal force cause the heavier particles of dust to be thrown against the curved wall of the casing until they pass tangentially through the slot 44 into the dust drawer 50. The air with the finer particles of dust entrained therein passes into the small open end 54 of the baffle or conduit 52 and through the conduit 52 into the filter chamber 60. Substantially all the remaining fine dust in the air is removed by the filter and the clean air is returned to the atmosphere by the fan 68.

The baffle 106 operates to reduce the swirl of the air current entering the outlet conduit 52. If the rotary movement of the air current passing through the outlet conduit is excessive, most of the air tends to occupy the annular space adjacent to the wall of the conduit. By reducing the rotary movement, the central portion also of the conduit is therefore made available. Reduction of the rotary movement thus tends to increase the effective cross-sectional area of the conduit and, therefore, to reduce the amount of power required to draw the desired volume of air through the apparatus. It has been found, however, that the best effect is not obtained by completely arresting the rotary moement. For this reason the baffle 106 is terminated at about one-third of the distance from the wall 58 to the inlet end 54 of the conduit. Most of the air current is interrupted by the baffle on its way to the outlet, but without completely arresting rotary movement of the air current. The residual rotary movement causes some of the entrained dust particles to be thrown against the inner wall of the outlet conduit and ventually to be directed to the edge and corner portions of the filter out of the direct path of the air current, thereby enabling the entire area of the filter to be utilized to better advantage by preventing premature clogging.

An advantage of the above-described dust separator resides in its compactness, enabling the dust separating apparatus and fan to be housed in a relatively small compartment. Although the volume of air passing through the machine is relatively large, considering the small size of the separating apparatus, the power required for effective separation is not excessive and is well within the limits imposed by practical considerations in the shoe repair trade. Indeed, the separating apparatus requires less power than its compactness might lead one to expect. The preliminary separation of the heavier particles of dust enables a minimum area of filtering material to be employed. The arrangement of the frusto-conical outlet conduit in the cylindrical casing provides for separation of these heavier particles in a minimum of space while at the same time enabling the otherwise waste space at the corners of the filter chamber to be utilized. The frusto-conical shape of the outlet conduit 52 is important inasmuch as it provides an annular passage of sufficient cross-sectional area for the air entering the casing while at the same time it delivers air over a larger area and at a lower velocity than if it were cylindrical. The various features of the dust separator all cooperate to permit it to be housed within the casing of a shoe repair machine without materially increasing its dimensions or the required power to an extent commercially prohibitive.

Having described my invention, what I claim as new and desire to secure by Letters Patent of the United States is:

A dust separator suitable for use in shoe repair machines, comprising a casing having a wall of substantially circular cross section disposed about a horizontal axis, an exit conduit of circular cross section within and coaxial with said casing arranged to discharge air through one end of said casing, the opposite end of said casing being closed, said exit conduit having an open end spaced from said closed end of the casing by one-half to one-third the length of the casing, a baffle having a plurality of radial vanes adjacent to the closed end of the casing and spaced from the open receiving end of said exit conduit, said baffle being arranged axially of the casing to reduce the rotary movement of the air current about to enter the conduit, said conduit being arranged within said casing to provide an annular passage between itself and the casing, said casing having an inlet above said axis arranged to direct the incoming air downwardly and tangentially into said annular passage whence the air passes into the space between the receiving end of the conduit and the closed end of the casing and thence into the conduit from which it is discharged, said inlet extending from the discharge end of the casing to a locality spaced from the closed end of the casing by a distance substantially equal to the distance at which the receiving end of the conduit is so spaced, said circular wall having a slot positioned below said axis and extending the length of the casing for discharging tangentially those heavy particles of dust which are thrown by gravity and centrifugal force against the circular wall, and an air-tight receptacle into which dust may pass from said slot.

LAMBERT S. LINDEROTH, Jr.